US011012462B2

(12) United States Patent
Huang et al.

(10) Patent No.: US 11,012,462 B2
(45) Date of Patent: May 18, 2021

(54) SECURITY MANAGEMENT FOR DATA SYSTEMS

(71) Applicant: INTERNATIONAL BUSINESS MACHINES CORPORATION, Armonk, NY (US)

(72) Inventors: He Yuan Huang, Beijing (CN); Wen Sun, Beijing (CN); Jun Wang, Littleton, MA (US); Guan Qun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 15/789,529

(22) Filed: Oct. 20, 2017

(65) Prior Publication Data

US 2019/0124107 A1 Apr. 25, 2019

(51) Int. Cl.
*H04L 9/00* (2006.01)
*H04L 29/06* (2006.01)

(52) U.S. Cl.
CPC ........ *H04L 63/1433* (2013.01); *H04L 63/105* (2013.01); *H04L 63/1425* (2013.01); *H04L 63/20* (2013.01)

(58) Field of Classification Search
CPC .................................................. H04L 63/1433
USPC ......................................................... 726/25
See application file for complete search history.

(56) References Cited

U.S. PATENT DOCUMENTS

| 9,472,084 | B1* | 10/2016 | Barak | G08B 21/187 |
| 10,083,439 | B2* | 9/2018 | Turgeman | G06Q 20/40 |
| 2016/0371489 | A1 | 12/2016 | Puri et al. | |
| 2017/0063890 | A1* | 3/2017 | Muddu | G06N 5/04 |

OTHER PUBLICATIONS

Mell et al., "The NIST Definition of Cloud Computing," National Institute of Standards and Technology, Sep. 2011, p. 1-3, Special Publication 800-145.

* cited by examiner

*Primary Examiner* — Christopher J Brown
(74) *Attorney, Agent, or Firm* — Caleb D. Wilkes (57) ABSTRACT

Implementations of the present disclosure relate to methods, systems, and computer program products for security management. In one implementation, a computer-implemented method is disclosed. In the method, a message sequence associated with a user may be obtained from a list of historical messages that are logged in a data system. A candidate operation may be determined based on the obtained message sequence and an association model, where the association model indicates associations between message sequences and operations that are supported in the data system. A security level of the candidate operation may be evaluated based on at least one historical operation that has been performed by the user in the data system. In other implementations, a computer-implemented system and a computer program product for security management are disclosed.

20 Claims, 6 Drawing Sheets

| Timestamp | Client IP | Port | User | HDFS Command | HDFS Object |
|---|---|---|---|---|---|
| 2014-12-14 10.33:13. 033 | 192.168.2.8 | 7675 | bi | getFileInfo | /user/CUSTOMERS1.csv |
| 2014-12-14 10.33:13. 038 | 192.168.2.8 | 7677 | biadmin | getFileInfo | /user/CUSTOMERS.csv |
| 2014-12-14 10.33:13. 040 | 192.168.2.8 | 7683 | biadmin | getFileInfo | /user/CUSTOMERS.csv |
| 2014-12-14 10.33:13. 041 | 192.168.2.8 | 7677 | biadmin | getBlockLocation | /user/CUSTOMERS.csv |
| 2014-12-14 10.33:13. 044 | 192.168.2.8 | 7686 | biadmin | getFileInfo | /user/CUSTOMERS.csv |
| 2014-12-14 10.33:13. 045 | 192.168.2.8 | 7683 | biadmin | getBlockLocation | /user/CUSTOMERS.csv |
| 2014-12-14 10.33:13. 049 | 192.168.2.8 | 7687 | biadmin | getFileInfo | /user/CUSTOMERS.csv |
| 2014-12-14 10.33:13. 051 | 192.168.2.8 | 7687 | biadmin | getFileInfo | /user/CUSTOMERS.csv |
| 2014-12-14 10.33:13. 054 | 192.168.2.8 | 7686 | biadmin | getBlockLocation | /user/CUSTOMERS.csv |
| 2014-12-14 10.33:13. 058 | 192.168.2.8 | 7687 | biadmin | delete | /user/CUSTOMERS.csv |

| 2014-12-14 10.33:13. 038 | 192.168.2.8 | 7677 | biadmin | getFileInfo | /user/CUSTOMERS.csv |
| 2014-12-14 10.33:13. 041 | 192.168.2.8 | 7677 | biadmin | getBlockLocation | /user/CUSTOMERS.csv |
| 2014-12-14 10.33:13. 044 | 192.168.2.8 | 7686 | biadmin | getFileInfo | /user/CUSTOMERS.csv |
| 2014-12-14 10.33:13. 054 | 192.168.2.8 | 7686 | biadmin | getBlockLocation | /user/CUSTOMERS.csv |
| 2014-12-14 10.33:13. 049 | 192.168.2.8 | 7687 | biadmin | getFileInfo | /user/CUSTOMERS.csv |
| 2014-12-14 10.33:13. 051 | 192.168.2.8 | 7687 | biadmin | getFileInfo | /user/CUSTOMERS.csv |
| 2014-12-14 10.33:13. 058 | 192.168.2.8 | 7687 | biadmin | delete | /user/CUSTOMERS.csv |

| Timestamp | Client IP | Port | User | HDFS Command | HDFS Object |
|---|---|---|---|---|---|
| 2014-12-14 10.33:21.075 | 192.168.2.8 | 3574 | biadmin | getFileInfo | /temp/.../staging/<job id>/job.jar |
| 2014-12-14 10.33:21.078 | 192.168.2.8 | 3574 | biadmin | getBlockLocation | /temp/.../staging/<job id>/job.jar |
| ... | | | | | |
| 2014-12-14 10.33:21.204 | 192.168.2.8 | 3574 | biadmin | getFileInfo | /temp/.../staging/<job id>/job.xml |
| 2014-12-14 10.33:21.211 | 192.168.2.8 | 3574 | biadmin | getBlockLocation | /temp/.../staging/<job id>/job.xml |
| 2014-12-14 10.33:21.499 | 192.168.2.8 | 2964 | biadmin | sendHeartBeat | |
| 2014-12-14 10.33:24.255 | 192.168.2.8 | 3576 | biadmin | getFileInfo | /temp/.../staging/ |
| 2014-12-14 10.33:24.258 | 192.168.2.8 | 3576 | biadmin | getFileInfo | /temp/.../staging/<job id>/COMIT_STARTED |
| ... | | | | | |
| 2014-12-14 10.33:26.021 | 192.168.2.8 | 3576 | biadmin | create | /temp/.../staging/<job id>/...jhist |
| ... | | | | | |
| 2014-12-14 10.33:27.102 | 192.168.2.8 | 3585 | biadmin | getBlockLocation | /temp/.../staging/<job id>/...job.split |
| 2014-12-14 10.33:27.311 | 192.168.2.8 | 3585 | biadmin | getBlockLocation | /user/Customers.csv |
| 2014-12-14 10.33:27.503 | 192.168.2.8 | 2964 | biadmin | sendHeartBeat | |
| 2014-12-14 10.33:28.024 | 192.168.2.8 | 3589 | biadmin | renewLease | |
| ... | | | | | |
| 2014-12-14 10.33:40.125 | 192.168.2.8 | 3590 | biadmin | getBlockLocation | /user/zhang/sales.txt |
| ... | | | | | |
| 2014-12-14 10.33:46.011 | 192.168.2.8 | 3591 | biadmin | create | /user/output1215_2/.../part-r-0000000_0_xxx |
| 2014-12-14 10.33:46.053 | 192.168.2.8 | 3591 | biadmin | addBlock | /user/output1215_2/.../part-r-0000000_0_xxx |

SECURITY MANAGEMENT FOR DATA SYSTEMS

BACKGROUND

The present disclosure generally relates to security management. Specifically, the present disclosure relates to methods, systems and program products for security management for a data system.

Nowadays, big data systems are getting more and more popular in the field of data storage. In the big data system, data is stored across a plurality of flat files instead of in structured tables of a traditional database such a rational database. Further, multiple channels (such as a command line, a MapReduce job, and a Hive query and the like) are provided for accessing the big data system. Accordingly, data management in the big data system may be much more complex than that in a traditional database.

SUMMARY

In one aspect, a computer-implemented method is disclosed. According to the method, a message sequence associated with a user may be obtained from a list of historical messages that are logged in a data system. A candidate operation may be determined based on the obtained message sequence and an association model, where the association model indicates associations between message sequences and operations that are supported in the data system. A security level of the candidate operation may be evaluated based on at least one historical operation that has been performed by the user in the data system.

In another aspect, a computer-implemented system is disclosed. The computing system comprises a computer processor coupled to a computer-readable memory unit, where the memory unit comprises instructions that when executed by the computer processor implements a method. According to the method, a message sequence associated with a user may be obtained from a list of historical messages that are logged in a data system. A candidate operation may be determined based on the obtained message sequence and an association model, where the association model indicates associations between message sequences and operations that are supported in the data system. A security level of the candidate operation may be evaluated based on at least one historical operation that has been performed by the user in the data system.

In another aspect, a computer program product is disclosed. The computer program product comprises a computer readable storage medium having program instructions embodied therewith. The program instructions are executable by an electronic device to cause the electronic device to perform actions of: obtaining a message sequence associated with a user from a list of historical messages that are logged in a data system; determining a candidate operation based on the obtained message sequence and an association model, the association model indicating associations between message sequences and operations that are supported in the data system; and evaluating a security level of the candidate operation based on at least one historical operation that has been performed by the user in the data system.

It is to be understood that the summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

Throughout the drawings, same or similar reference numerals represent the same or similar elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
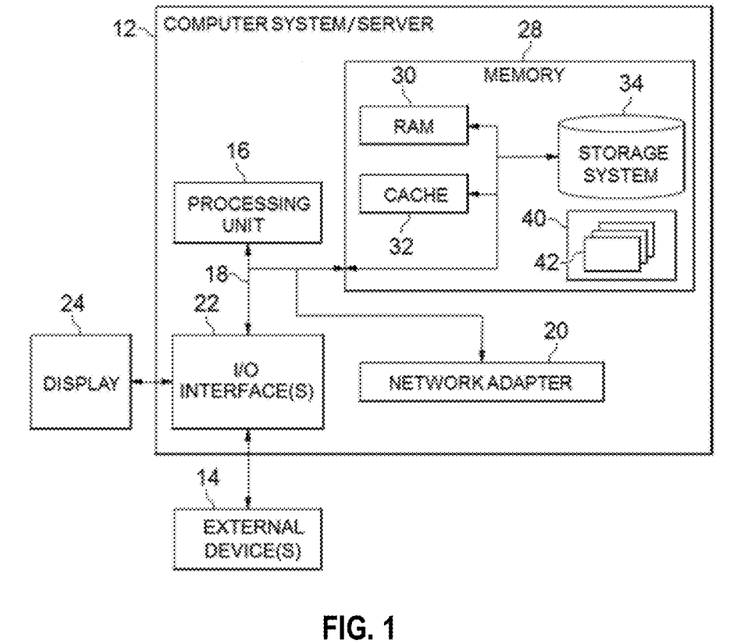
FIG. 1 depicts a cloud computing node according to an embodiment of the present invention.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
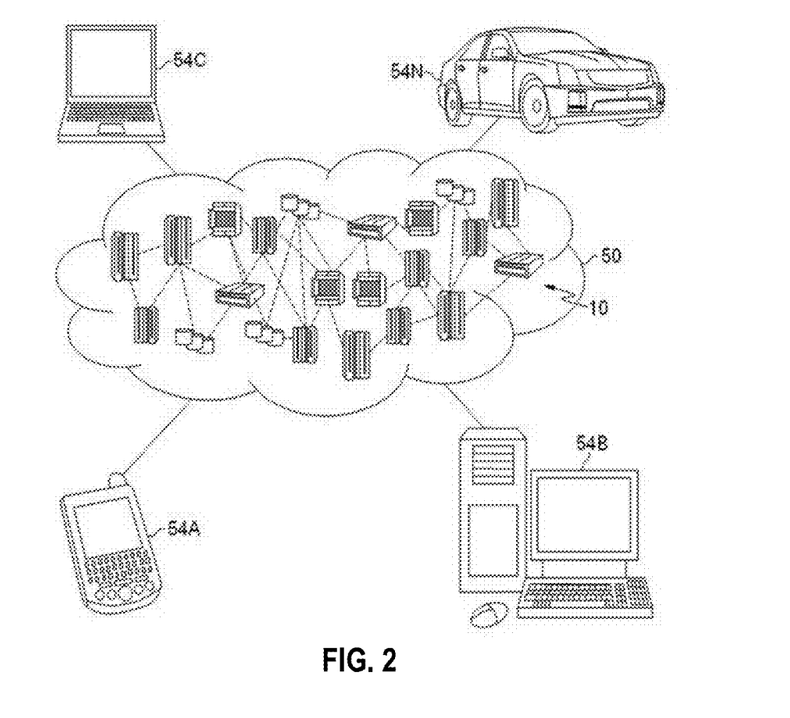
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
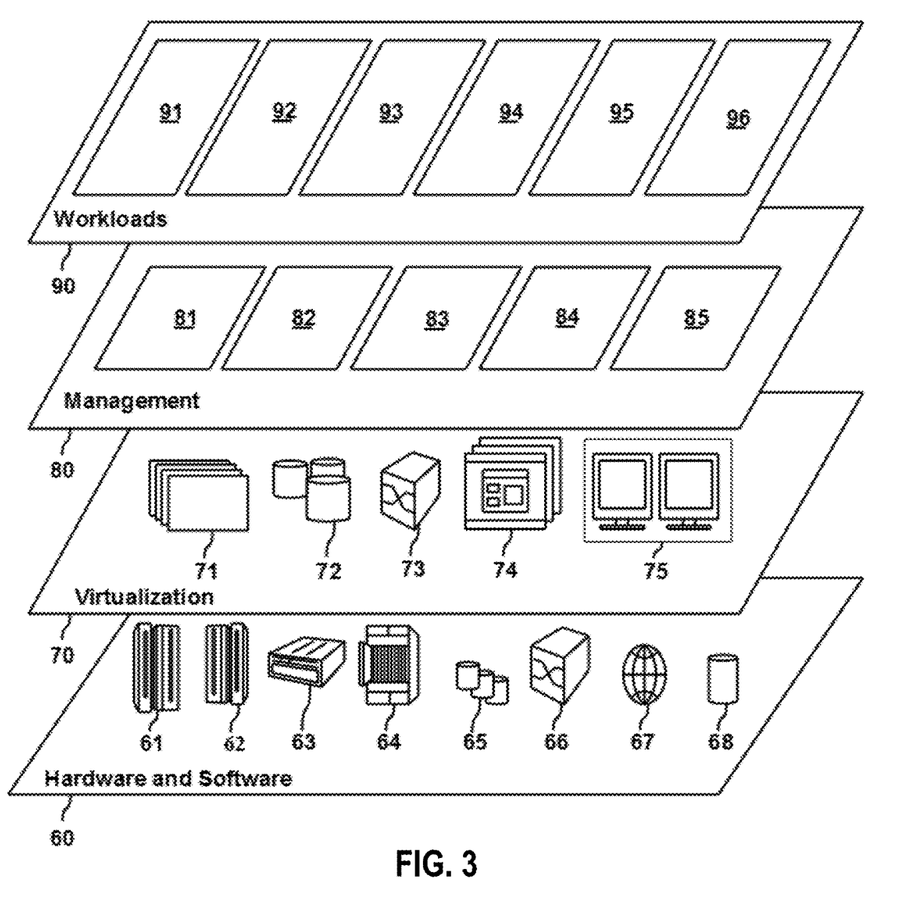
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security processing 96. Hereinafter, reference will be made to FIGS. 4 to 11 to describe details of the security processing 96.

Various solutions are provided for security management in data storage systems. Traditionally, business data is stored in relational databases (RDB) or RDB based data warehouse. Security management solutions monitor SQL requests/responses to track access to RDB objects such as tables, columns, and the like. With the development of the big data system, more and more data is stored in flat files in the big data system instead of RDBs. In the big data system, users may perform operations via different channels to access the stored data. Further, an operation is typically organized into a pipeline of steps to be executed within the big data system. Attackers may perform malicious operations, which may lead to a threat to the big data system. Accordingly, techniques for security management designed for RDBs are not applicable in the big data system.

According to some solutions, encryption and decryption are adopted in protecting the stored data. However, these solutions can only provide passive defense and cannot initiatively monitor the operations of the users and prevent the potential risk. Therefore, it is challenging to detect malicious operations in the big data system.

In order to at least partially solve the above and other potential problems, a new method for security management is disclosed according to implementations of the present disclosure. For the sake of description, implementations of the present disclosure will be described by taking a big data system including business data of a company as an example of a data system. Here, the big data system may include flat files about various aspects of the company. For example, these flat files may include technical documents about products of the company, financial documents such as sale reports, and other documents such as employee profiles.

Figure 4:
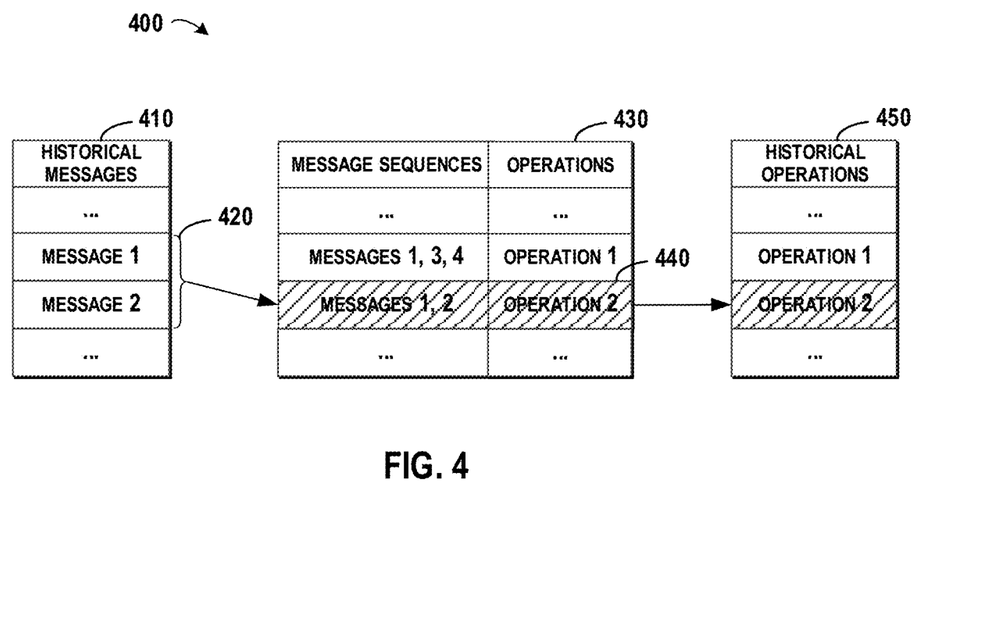
FIG. 4 depicts an example diagram for evaluating a security level for a data system according to one implementation of the present disclosure.

Hereinafter, reference will be made to FIG. 4 for a general description of the present disclosure. FIG. 4 depicts an example diagram 400 for evaluating a security level for a big data system according to one implementation of the present disclosure. In the context of the present disclosure, various users of the big data system may perform high level operations according to various channels such as the command line, the MapReduce job, and the Hive query and the like. In order to run these high level operations in the big data system, these operations may be translated into underlying instructions for implementation by the big data system. Although the data log, such as a list of historical messages 410, may record detailed messages related to these underlying instructions, each of these messages shows fragment information about these high level operations and cannot provide meaningful descriptions for these operations.

In the implementation of the present disclosure, the list may refer to a data log including historical messages 410 that are logged in a big data system. Here, the list may include messages generated from various operations by various users. From the list, a message sequence 420 associated with a user may be obtained. Referring to FIG. 4, the message sequence 420 including messages 1 and 2 may be obtained from the list. In the big data system, an association model 430 may be provided for indicating associations between message sequences and operations that are supported in the big data system. For example, the association model 430 shows that operation 1 may be associated with a message sequence including messages 1, 3 and 4, and operation 2 may be associated with a message sequence including messages 1 and 2.

A candidate operation 440 (as shown in the shaded block of FIG. 4) may be determined based on the obtained message sequence 420 and the association model 430. Then, a security level may be evaluated based on the determined candidate operation and at least one historical operation 450 that have been performed by the user in the big data system. Specifically, the candidate operation 440 may be compared with the at least one historical operation 450 that has been performed by the user, so as to determine whether the user has performed such type of an operation.

Here, the historical operations 450 refer to safe and normal operations and exclude the unsafe and abnormal ones. In this implementation, if the type of the candidate operation 440 has never been performed in the big data system, then it may be reasonable to believe that the candidate operation 440 is a suspicious one. Accordingly, further procedures should be performed to confirm whether the candidate operation results in a potential risk to the big data system.

In the context of the present disclosure, the messages scattered in the list of historical messages 410 may be organized into one or more message sequences. Further, the message sequence may be mapped to the candidate operation 440 to determine whether the candidate operation is safe or not. In one implementation of the present disclosure, if the candidate operation is of a common type that is frequently performed by the user, then it may indicate that the candidate operation is very likely to be a safe one; otherwise, if the type of the candidate operation has never been performed by the user, then the candidate operation may possibly be an unsafe one.

Figure 5:
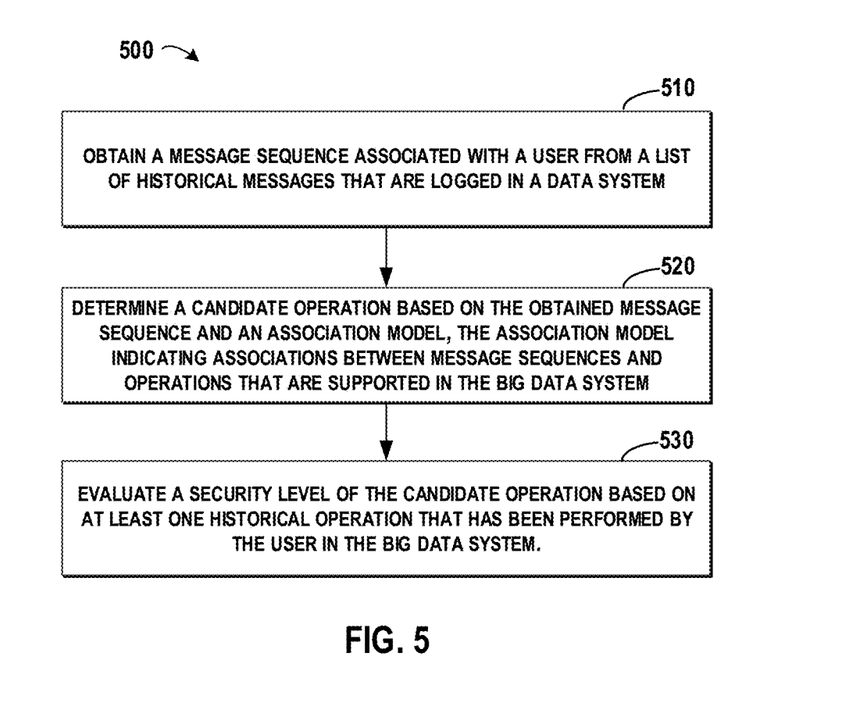
FIG. 5 depicts an example flowchart of a method for evaluating a security level for a data system according to one implementation of the present disclosure.

FIG. 5 depicts an example flowchart of a method 500 for evaluating a security level for a big data system according to one implementation of the present disclosure. Here, a message sequence 420 associated with a user may be obtained 510 from a list of historical messages 410 that are logged in a big data system.

Figure 6:
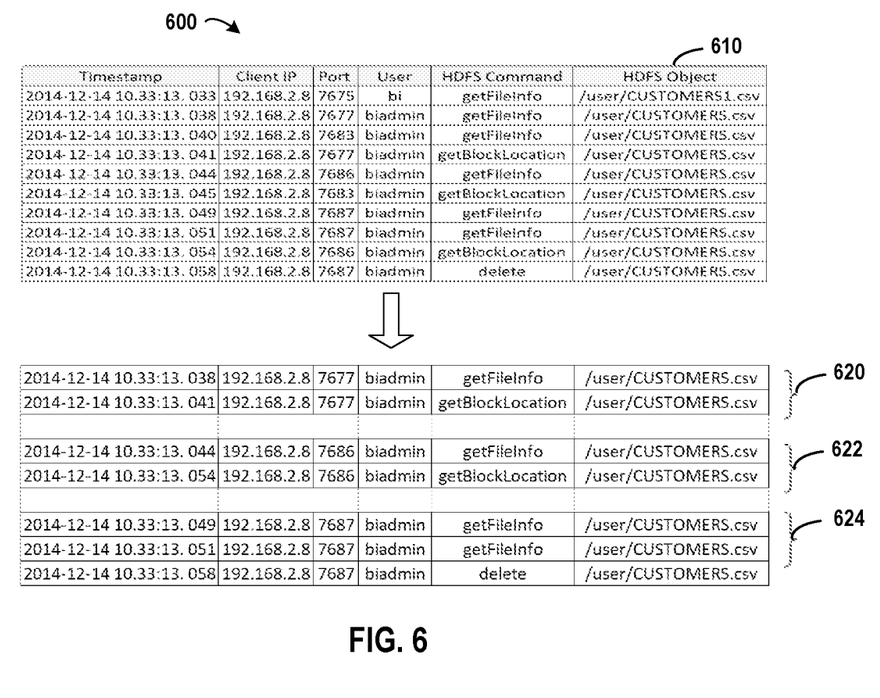
FIG. 6 depicts an example diagram for obtaining message sequences associated with a user from a list of historical messages that are logged in a data system according to one implementation of the present disclosure.

In the implementation of the present disclosure, the list of historical messages 410 may be filtered according to at least one parameter of the historical messages 410, where the at least one parameter may include any of an IP address, a port number, a time point, or target data associated with the historical messages. After that, the message sequence may be determined based on the filtered list of historical messages. Reference will be made to FIG. 6 for details, which figure depicts an example diagram 600 for obtaining message sequences associated with a user from a list of historical messages that are logged in a big data system according to one implementation of the present disclosure.

According to FIG. 6, the historical messages 410 may be recorded in a table 610 including several fields. Here, the "Timestamp" field indicates a time point at which the message is collected; the "Client IP" field indicates an IP address from which the user is connected to the big data system; the "Port" field indicates a port number from which the user is connected; the "HDFS Command" field indicates a name of the command; and the "HDFS Object" field indicates an object on which the command is performed. Based on the above fields, the messages may be filtered to determine the related ones.

For example, if it is desired to evaluate the operations of the user "biadmin," then the historical messages 410 in the table 610 may be filtered according to the "User" filed. At this point, the first entry which is associated with the user "bi" may be filtered out. It is to be understood that, the messages generated from one operation may have same IP address and same port number, thereby the message with a different IP address and/or a different port number may be filtered out. At this point, with respect to table 610, the third entry may be filtered out because the port number "7683" is different from the port number "7677" of the second and the fourth entries.

Further, the object on which the command is performed may be utilized for the filtering. For example, the first entry may be filtered out because the HDFS object "/user/CUSTOMER1.csv" is different from those of the other entries in the table 610. Although not illustrated in the table 610, the historical messages 410 may be filtered according to another criterion such as a folder name, a format of the HDFS Objects and the like. Based on the above, three message sequences 620, 622, and 624 may be obtained from the historical messages 410 in the table 610.

Referring back to FIG. 5, the candidate operation 440 may be determined 520 based on the message sequence 420 and an association model 430. Here, the association model 430 may indicate associations between message sequences and operations that are supported in the big data system. As the operations supported in the big data system is known, each of these operations may be performed to collect messages associated with each operation. Then the association model 430 may be defined according to the supported operations and the collected messages.

In one example, when the user performs a command line operation "get," two messages getFileInfo and getBlockLocation may be generated from the operation "get." In another example, when the user performs a command line operation "rm," three messages getFileInfo, getFileInfo, and delete may be generated. At this point, an example association model 430 for a Hadoop system may be defined as below in Table 1.

TABLE 1

Example Association model

| No. | Message | Operation |
| --- | --- | --- |
| 1 | getFileInfo, getBlockLocation | Hadoop fs-get |
| 2 | getFileInfo, getBlockLocation | Hadoop fs-cat |
| 3 | getFileInfo, getFileInfo, delete | Hadoop fs-rm |
| 4 | Messages 7, 8, 9 | XXX |
| ... | ... | ... |

Although the above Table 1 defines the association model 430 in the form of a table, it is only an example association model by taking a Hadoop system as an example of the big data system. Those skilled in the art may define the association model 430 in another data structure such as an array, a linked list and the like. It is to be understood that, in the above Table 1, although the two operations "Hadoop fs-get" and the "Hadoop fs-cat" appear to be associated with the same message sequence (getFileInfo, getBlockLocation), based on other information that is logged, the two operations may be distinguished.

Based on the above Table 1, the three message sequences 620, 622, and 624 in FIG. 6 may be mapped to the following candidate operations, respectively:
Message sequence 620: 2014-12-14 10.33:13.035 Hadoop fs-get/user/CUSTOMERS.csv
Message sequence 622: 2014-12-14 10.33:13.043 Hadoop fs-cat/user/CUSTOMERS.csv
Message sequence 624: 2014-12-14 10.33:13.047 Hadoop fs-rm/user/CUSTOMERS.csv Once the candidate operation 440 is determined, a security level of the candidate operation 440 may be evaluated 530 based on at least one historical operation that has been performed by the user in the big data system. Here, the at least one historical operation may be stored in advance. Supposing that the historical operations indicates the user performed "get" and "cat" frequently in his/her previous operations but never performed "rm," then it may be determined that the operations "get" and "cat" may be safe but the operation "rm" may be a suspicious one.

The above paragraphs have provided general descriptions of implementations of the present disclosure, hereinafter, detailed information will be provided. It is to be understood that the candidate operation 440 may relates to various aspects. Taking the "get" operation as an example, although the type of the "get" operation has been performed in the past, the "get" operation still may be considered as an unsafe one when other aspects of the "get" operation are considered. Accordingly, a similarity degree may be obtained between the determined candidate operation and the at least one historical operation based on a similarity analysis, and then the security level may be determined based on the obtained similarity degree.

Figure 7:
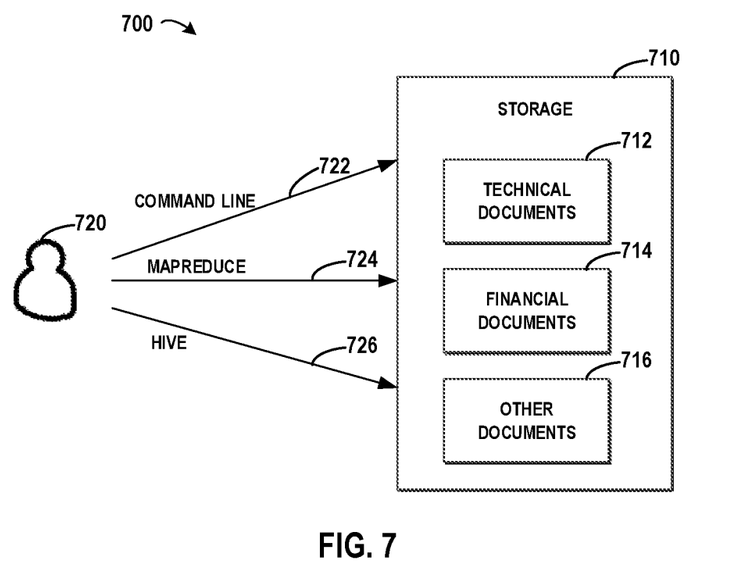
FIG. 7 depicts an example diagram for performing operations via various channels on a distributed storage system including various documents according to one implementation of the present disclosure.

FIG. 7 depicts an example diagram for performing operations via various channels on a distributed storage system 700 including various documents according to one implementation of the present disclosure, and reference will be made to FIG. 7 for describing the similarity degree. A reference number 710 indicates storage in the big data system. Although not illustrated in FIG. 7, the storage 710 may include one or more data nodes distributed in one or more locations. According to FIG. 7, various documents, such as technical documents 712, financial documents 714 and other documents 716, may be stored in the storage 710. The user 720 may access the documents in the storage 710 via different channels such as a command line 722, a MapReduce job 724, or a Hive query 726. Further, the user 720 may perform the operations at different time slots, from different IP addresses, and via different port numbers. As each of the above aspects may influence the safety of the operation, all these aspects may be considered in determining the similarity degree.

In one implementation of the present disclosure, at least one feature of the candidate operation may be utilized in determining the similarity degree. The feature includes any of: a type of the candidate operation; a classification of data accessed by the candidate operation; a location of data accessed by the candidate operation; a channel via which the candidate operation was performed; a time slot during which the candidate operation was performed; an address at which the candidate operation was performed; or a port number via which the candidate operation was performed.

In one implementation of the present disclosure, a feature of the candidate operation and at least one reference feature of the at least one historical operation may be determined, respectively. Then the similarity degree may be determined based on a similarity between the determined feature and the reference features.

Hereinafter, details will be presented for each of these features. Regarding the classification of the accessed data, if the user only performed "get" and "cat" operations and never performed the "rm" operation, then a candidate operation of the type "rm" may result in a low similarity degree. In turn, the security level evaluated based on the similarity degree may indicate "unsafe." In another example, if the candidate operation is the "get" operation, then this candidate operation is consistent with the historical operations and the similarity degree will be high. In turn, the security level may be identified as "safe."

Regarding the classification of the accessed data, if the user is an engineer and reads technical documents 712 all the time, then a candidate operation targeting for the financial documents 714 may result in a low similarity degree. In turn, the security level evaluated based on the similarity degree may indicate "unsafe." In another example, if the candidate operation is targeting for the technical documents 712, then this candidate operation is consistent with the historical operations and the similarity degree will be high. In turn, the security level may be identified as "safe."

Regarding the location of the accessed data, if the user always accesses the data node in Beijing but never accesses the data node in Shanghai, then a candidate operation targeting for the data node in Shanghai may result in a low similarity degree. In turn, the security level evaluated based on the similarity degree may indicate "unsafe." In another example, if the candidate operation is targeting for the data node in Beijing, then this candidate operation is consistent with the historical operations and the similarity degree will be high. In turn, the security level may be identified as "safe."

Regarding a time slot during which the candidate operation was performed, if the user always performs the operation during working hours but never at night, then a candidate operation at night time may result in a low similarity degree. In turn, the security level evaluated based on the similarity degree may indicate "unsafe." In another example, if the candidate operation performed during working hours, then this candidate operation is consistent with the historical operations and the similarity degree will be high. In turn, the security level may be identified as "safe."

Regarding an address at which the candidate operation was performed, if the user always performs the operation at 192.168.2.8, then a candidate operation at a different IP address may result in a low similarity degree. In turn, the security level evaluated based on the similarity degree may indicate "unsafe." Further, the port number may also be considered in determining the similarly degree, and details will be omitted hereinafter.

In one implementation of the present disclosure, the channel by which the candidate operation was performed may be considered in determining the similarity degree. It is to be understood that the messages caused by an operation in a channel may present a certain pattern. For example, the messages caused by the MapReduce operation may include messages relating to localizing files, creating logs, getting input splits, and creating output.

Figure 8:
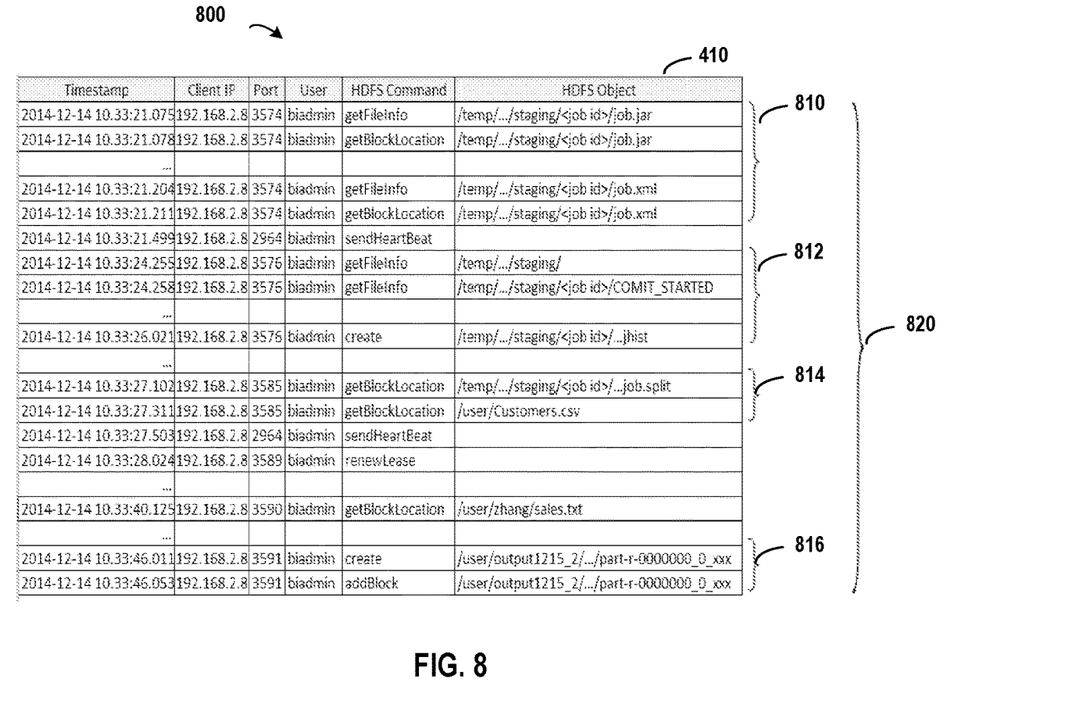
FIG. 8 depicts an example diagram for obtaining message sequences associated with a MapReduce job from a list of historical messages that are logged in a data system according to one implementation of the present disclosure.

FIG. 8 depicts an example diagram 800 for obtaining message sequences associated with a MapReduce job 820 from a list of historical messages that are logged in a big data system according to one implementation of the present disclosure. Reference will be made to this figure for describing details about the MapReduce job 820. Compared with the command line operation, the MapReduce job 820 usually relates to complex computing functions and thus may be associated with more messages. In FIG. 8, multiple messages sub-sequences 810, 812, 814 and 816 may be obtained from the historical messages 410. Here, each of these sub-sequences may correspond to a specific function. For example, the sub-sequence 810 may relate to localizing files, the sub-sequence 812 may relate to creating logs, the sub-sequence 814 may relate to getting input splits, and the sub-sequence 816 may relate to creating output. In total, the four sub-sequences may form a candidate operation, which is a MapReduce job 820.

Once it is determined that the candidate operation is a MapReduce job 820, the channel of the candidate operation may be utilized for determining the similarity degree. If the user always performs command line operations but never perform the MapReduce job 820, then a candidate operation performed in the MapReduce channel may result in a low similarity degree. In turn, the security level evaluated based on the similarity degree may indicate "unsafe." In another example, if the candidate operation is performed via the command line channel, then this candidate operation is consistent with the historical operations and the similarity degree will be high. In turn, the security level may be identified as "safe."

Although the above paragraphs describe how to determine the similarity degree with respect to each of the features, in another implementation, the above features may be combined to determine the similarity decree. At this point, some or all of the features may be considered in determining the similarity degree. For example, the classification of the accessed data and the channel may be utilized together. Supposing the user is an accountant and always accesses the financial documents 714 via MapReduce job 820, and the candidate operation accesses technical documents 712 via the "get" command line operation. Based on the above, it may be determined that the similarity degree is low and thus the candidate operation may be evaluated as "unsafe."

In one implementation of the present disclosure, the similarity determined from each of the above features may be weighted to obtain a final similarity degree. Although the above paragraphs have described how to identify the security level into "safe" and "unsafe" ones, in another implementation, the security level may be divided into finer granularity such as "safe," "suspicious," or "unsafe."

Figure 9:
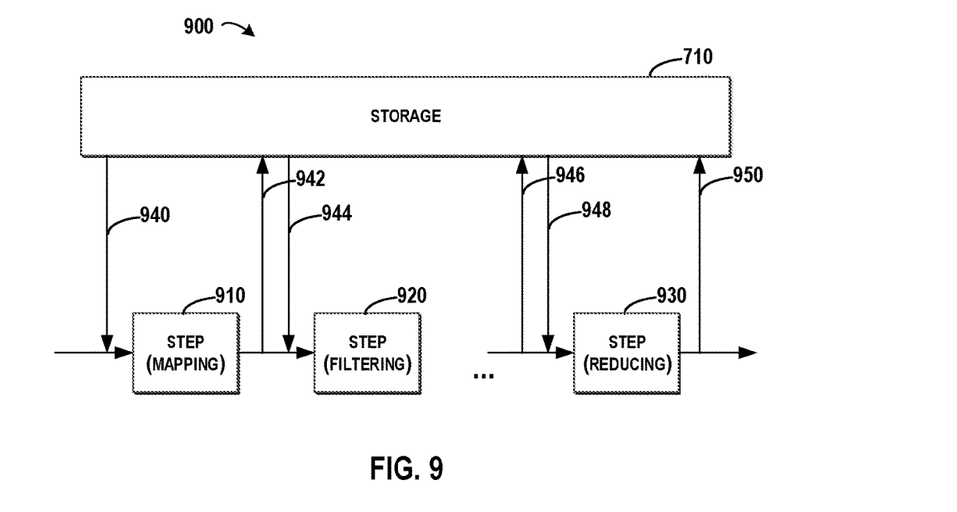
FIG. 9 depicts an example pipeline associated with a candidate operation according to one implementation of the present disclosure.

Beyond the above features, the candidate operation may be analyzed to generate an analytics pattern for indicating further information about the candidate operation. Reference will be made to FIG. 9 for describing an example pipeline associated with a candidate operation according to one implementation of the present disclosure.

According to FIG. 9, multiple steps (such as step 910, step 920, . . . , and step 930) may be executed for performing the candidate operation 900. Further, each of these steps may relate to data inputted into the storage 710 and data outputted from the storage 710. As illustrated by an arrow 940, data may be output from the storage 710 so as to execute the step 910. Next, the result from the step 910 may be input 942 into the storage 710. Similarly, arrows 944 and 948 may indicate data that is output from the storage 710 for executing the steps 920 and 930 respectively, and the arrows 946 and 950 may indicate data that is input into the storage 710, respectively.

It is to be understood that the steps may be divided according to the data input/output involved in the candidate operation, and each step may correspond to one or more messages in the message sequence. Details will be omitted hereinafter so as to not obscure the implementation. As the above data flow and the pipeline may reflect details of the candidate operation, they may be utilized in further analyzing the candidate operation.

Based on the above, an analytics pattern may be generated from the candidate operation, where the analytics pattern may indicate analytical data associated with the candidate operation. Further, the security level may be evaluated based on the generated analytics pattern and a reference analytics pattern generated from the historical operations. In this implementation, reference analytics pattern may be generated in advance and serve as the basis for evaluating the security level.

In one implementation of the present disclosure, the analytics pattern may comprise any of: a time order of steps in the candidate operation, an amount of data inputted by the candidate operation; an amount of data outputted from the candidate operation; an input and output ratio associated with the candidate operation, an amount of computing resource associated with the candidate operation, or a distribution of data accessed by the candidate operation.

Hereinafter, details will be presented for various aspects of the analytics pattern. In one implementation of the present disclosure, a time order indicates the chronological order of the steps included in the candidate operation. In an example, the reference analytics pattern shows that generally a MapReduce job 820 includes steps such as mapping 910, filtering 920, . . . , and reducing 930. If the to-be-evaluated candidate operation is not started from a mapping step, then the candidate operation may be identified as an "unsafe" one and needs further confirmation.

In one implementation of the present disclosure, an amount of data inputted by the candidate operation may indicate the data amount inputted in one or more steps included in the candidate operation. For example, the data amount related to the first step may be determined for being compared with the corresponding reference data amount that is generated from the historical operations. If the reference data amount is in the order of megabyte while the data amount of the candidate operation reaches gigabyte, then this candidate operation may be labelled as an "unsafe" operation.

In one implementation of the present disclosure, an amount of data outputted from the candidate operation may indicate the data amount outputted from one or more steps included in the candidate operation. For example, the data amount related to the last step may be determined for being compared with the corresponding reference data amount that is generated from the historical operations. If the reference data amount is in the order of megabyte while the data amount of the candidate operation reaches gigabyte, then this candidate operation may be labelled as an "unsafe" operation.

In one implementation of the present disclosure, a ratio of the input and output may indicate the ratio related to one or more steps included in the candidate operation. For example, the ratio may be determined based on a total input data amount and the total output data amount. Then the determined ratio may be compared with the corresponding reference ratio that is generated from the historical operations. If the reference ratio is within the range of [0.1, 0.2] and the ratio of the candidate operation reaches 1, then this candidate operation may be labelled as an "unsafe" operation.

In one implementation of the present disclosure, an amount of computing resource may indicate the amount of computing resource that is requested for performing the candidate operation. For example, if 2 normal computing cores (with a predefined specification) are requested for one historical operation, and 6 computing cores with the same specification are requested by the candidate operation, then this candidate operation may be labelled as an "unsafe" operation.

Figure 10:
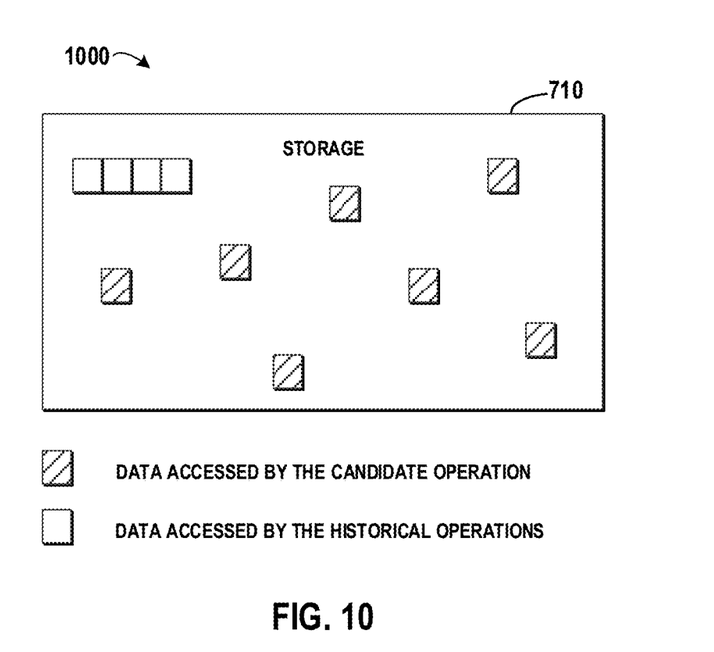
FIG. 10 depicts example distributions associated with data accessed by a candidate operation and historical operations respectively according to one implementation of the present disclosure.

In one implementation of the present disclosure, a distribution of data accessed by the candidate operation may be considered as another criterion for determining the similarity degree, and reference will be made to FIG. 10 for description. FIG. 10 depicts example distributions 1000 associated with data accessed by a candidate operation and historical operations respectively according to one implementation of the present disclosure. According to FIG. 10, the blank blocks show data blocks that are accessed by the historical operations, and the shaded blocks show data blocks that are accessed by the candidate operation. As shown, the blank blocks are concentrated in a continuous area within the storage 710, while the shaded blocks are scattered among the storage 710. Based on the above different distribution, this candidate operation may be labelled as an "unsafe" operation.

In one implementation of the present disclosure, the association model 430 may be updated in response to the operations that are supported in the big data system being changed. With the development of the big data system, the supported operations may change and thus the association model 430 should be updated accordingly. For example, if a new command line operation "XXX" is added in the big data system and this operation "XXX" is associated with Messages 7, 8, and 9, then the association model 430 may be updated to Table 2 as below.

TABLE 2

Example Association model

| No. | Message | Operation |
| --- | --- | --- |
| 1 | getFileInfo, getBlockLocation | Hadoop fs-get |
| 2 | getFileInfo, getBlockLocation | Hadoop fs-cat |
| 3 | getFileInfo, getFileInfo, delete | Hadoop fs-rm |
| 4 | Messages 7, 8, 9 | XXX |
| . . . | . . . | . . . |

Figure 11:
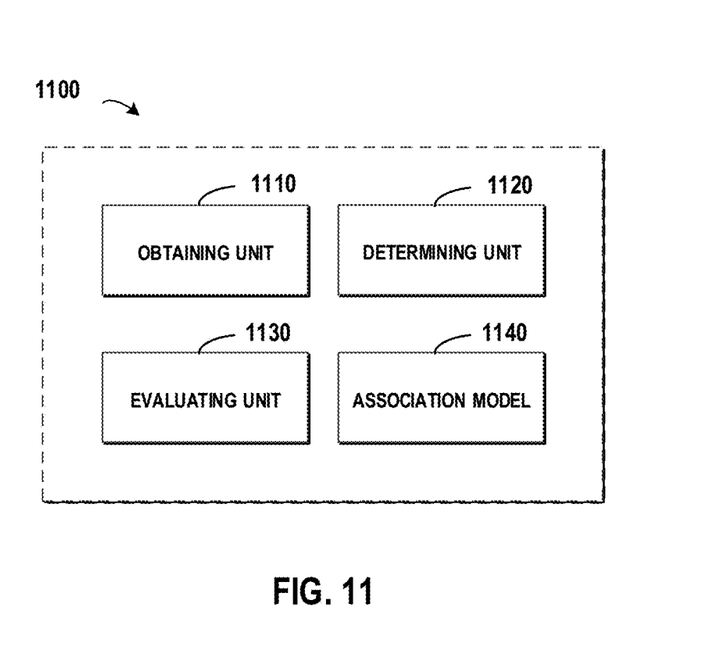
FIG. 11 depicts an example diagram of a system for evaluating a security level for a data system according to one implementation of the present disclosure.

FIG. 11 depicts an example diagram of a system for evaluating a security level for a big data system according to one implementation of the present disclosure. In the system 1100, an obtaining unit 1110 may be provided for obtaining a message sequence associated with a user from a list of historical messages that are logged in a big data system. A determining unit 1120 may be provided for determining a candidate operation based on the obtained message sequence and an association model 1140, here the association model 1140 may be provided for indicating associations between message sequences and operations that are supported in the big data system. Further, an evaluating unit 1130 may be provided for evaluating a security level of the candidate operation based on at least one historical operation that has been performed by the user in the big data system.

With implementations of the present disclosure, the messages scattered in the list of historical messages 410 may be organized into one or more message sequences. Further, the message sequence may be mapped to the candidate operation 440 to determine whether the candidate operation is safe or not. Accordingly, the implementations may provide a fast and convenience manner for security management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
organizing, into a message sequence, messages associated with a user and scattered in a list of historical messages that are logged in a data system, wherein the organizing is performed via one or more processors;
determining, via the one or more processors, a candidate operation based on the obtained message sequence and an association model, the association model indicating associations between message sequences and operations that are supported in the data system, wherein each individual message of the message sequences provides fragment information about the associated operation of the operations, wherein each of the operations and the candidate operation is a respective high-level operation in the data system, and wherein the high-level operation comprises at least one member selected from the group consisting of copying a file to a local file system, removing a file from a file system, reading and displaying a file content, and data processing;
evaluating, via the one or more processors, a security level of the candidate operation based on at least one historical operation that has been performed by the user in the data system, wherein the evaluating the security level comprises:
obtaining a similarity degree between the determined candidate operation and the at least one historical operation based on a similarity analysis, wherein the obtaining the similarity degree comprises:
determining a feature of the candidate operation and at least one reference feature of the at least one historical operation, wherein the determined feature comprises a type of the candidate operation and the determined at least one reference feature comprises a reference type of the at least one historical operation; and
determining the similarity degree based on a similarity between the determined feature and the determined at least one reference feature;
determining the security level based on the obtained similarity degree; and
indicating the evaluated security level, wherein the evaluated security level is selected from the group consisting of safe, suspicious, and unsafe.

2. The method of claim 1, further comprising:
generating, via the one or more processors, an analytics pattern for the candidate operation, the analytics pattern indicating analytical data associated with the candidate operation; and
evaluating, via the one or more processors, the security level based on the generated analytics pattern and a reference analytics pattern generated from the at least one historical operation;
wherein the analytics pattern is selected from the group consisting of a time order of steps in the candidate operation, an amount of data inputted by the candidate operation, an amount of data outputted by the candidate operation, a ratio of the amounts of data inputted and outputted by the candidate operation, and an amount of computing resource associated with the candidate operation.

3. The method of claim 1, further comprising:
filtering, via the one or more processors, the list of historical messages according to at least one parameter of the historical messages, the at least one parameter including any of an IP address, a port number, a time point, or target data associated with the historical messages; and
obtaining, via the one or more processors, the message sequence based on the filtered list of historical messages.

4. The method of claim 1, further comprising:
updating, via the one or more processors, the association model in response to the operations that are supported in the data system being changed.

5. The method of claim 1, further comprising:
generating an analytics pattern for the candidate operation, wherein the analytics pattern indicates analytical data associated with the candidate operation, and wherein the analytics pattern is a distribution of data blocks accessed by the candidate operation; and
evaluating the security level based on the generated analytics pattern and a reference analytics pattern generated from the at least one historical operation.

6. The method of claim 5, wherein the data blocks comprise a member selected from the group consisting of a product technical document, a sales report, and an employee profile.

7. The method of claim 1, wherein the at least one historical operation is a safe and normal operation.

8. A computer system, comprising a computer processor coupled to a computer-readable memory unit, the memory unit comprising instructions that when executed by the computer processor implements a method comprising:
organizing, into a message sequence, messages associated with a user and scattered in a list of historical messages that are logged in a data system;
determining a candidate operation based on the obtained message sequence and an association model, the association model indicating associations between message sequences and operations that are supported in the data system, wherein each individual message of the message sequences provides fragment information about the associated operation of the operations, wherein each of the operations and the candidate operation is a respective high-level operation in the data system, and wherein the high-level operation comprises at least one member selected from the group consisting of copying a file to a local file system, removing a file from a file system, reading and displaying a file content, and data processing;
evaluating a security level of the candidate operation based on at least one historical operation that has been performed by the user in the data system, wherein the evaluating the security level comprises:
obtaining a similarity degree between the determined candidate operation and the at least one historical operation based on a similarity analysis, wherein the obtaining the similarity degree comprises:
determining a feature of the candidate operation and at least one reference feature of the at least one historical operation, wherein the determined feature comprises a type of the candidate operation and the determined at least one reference feature comprises a reference type of the at least one historical operation; and determining the similarity degree based on a similarity between the determined feature and the determined at least one reference feature; and
determining the security level based on the obtained similarity degree; and
indicating the evaluated security level, wherein the evaluated security level is selected from the group consisting of safe, suspicious, and unsafe.

9. The computer system of claim 8, wherein the method further comprises:
generating an analytics pattern for the candidate operation, the analytics pattern indicating analytical data associated with the candidate operation; and
evaluating the security level based on the generated analytics pattern and a reference analytics pattern generated from the at least one historical operation;
wherein the analytics pattern is selected from the group consisting of a time order of steps in the candidate operation, an amount of data inputted by the candidate operation, an amount of data outputted by the candidate operation, a ratio of the amounts of data inputted and outputted by the candidate operation, and an amount of computing resource associated with the candidate operation.

10. The computer system of claim 8, wherein the method further comprises:
filtering the list of historical messages according to at least one parameter of the historical messages, the at least one parameter including any of an IP address, a port number, a time point, or target data associated with the historical messages; and
obtaining the message sequence based on the filtered list of historical messages.

11. The computer system of claim 8, wherein the method further comprises updating the association model in response to the operations that are supported in the data system being changed.

12. The computer system of claim 8, wherein the method further comprises:
generating an analytics pattern for the candidate operation, wherein the analytics pattern indicates analytical data associated with the candidate operation, and wherein the analytics pattern is a distribution of data blocks accessed by the candidate operation; and
evaluating the security level based on the generated analytics pattern and a reference analytics pattern generated from the at least one historical operation.

13. The computer system of claim 12, wherein the data blocks comprise a member selected from the group consisting of a product technical document, a sales report, and an employee profile.

14. The computer system of claim 8, wherein the at least one historical operation is a safe and normal operation.

15. A computer program product, the computer program product comprising a computer readable storage medium having program instructions embodied therewith, wherein the program instructions are executable by an electronic device to cause the electronic device to perform a method comprising:
organizing, into a message sequence, messages associated with a user and scattered in a list of historical messages that are logged in a data system;
determining a candidate operation based on the obtained message sequence and an association model, the association model indicating associations between message sequences and operations that are supported in the data system, wherein each individual message of the message sequences provides fragment information about the associated operation of the operations, wherein each of the operations and the candidate operation is a respective high-level operation in the data system, and wherein the high-level operation comprises at least one member selected from the group consisting of copying a file to a local file system, removing a file from a file system, reading and displaying a file content, and data processing;
evaluating a security level of the candidate operation based on at least one historical operation that has been performed by the user in the data system, wherein the evaluating the security level comprises:
obtaining a similarity degree between the determined candidate operation and the at least one historical operation based on a similarity analysis, wherein the obtaining the similarity degree comprises:
determining a feature of the candidate operation and at least one reference feature of the at least one historical operation, wherein the determined feature comprises a type of the candidate operation and the determined at least one reference feature comprises a reference type of the at least one historical operation; and
determining the similarity degree based on a similarity between the determined feature and the determined at least one reference feature; and
determining the security level based on the obtained similarity degree; and
indicating the evaluated security level, wherein the evaluated security level is selected from the group consisting of safe, suspicious, and unsafe.

16. The computer program product of claim 15, wherein the method further comprises:
generating an analytics pattern for the candidate operation, wherein the analytics pattern indicates analytical data associated with the candidate operation; and
evaluating the security level based on the generated analytics pattern and a reference analytics pattern generated from the at least one historical operation;
wherein the analytics pattern is selected from the group consisting of a time order of steps in the candidate operation, an amount of data inputted by the candidate operation, an amount of data outputted by the candidate operation, a ratio of the amounts of data inputted and outputted by the candidate operation, and an amount of computing resource associated with the candidate operation.

17. The computer program product of claim 15, wherein the method further comprises:
filtering the list of historical messages according to at least one parameter of the historical messages, the at least one parameter including any of an IP address, a port number, a time point, or target data associated with the historical messages; and
obtaining the message sequence based on the filtered list of historical messages.

18. The computer program product of claim 15, wherein the method further comprises updating the association model in response to the operations that are supported in the data system being changed.

19. The computer program product of claim 15, wherein the method further comprises:
generating an analytics pattern for the candidate operation, wherein the analytics pattern indicates analytical data associated with the candidate operation, and wherein the analytics pattern is a distribution of data blocks accessed by the candidate operation; and evaluating the security level based on the generated analytics pattern and a reference analytics pattern generated from the at least one historical operation.

20. The computer program product of claim 19, wherein the data blocks comprise a member selected from the group consisting of a product technical document, a sales report, and an employee profile.

* * * * *